United States Patent [19]

Wahl et al.

[11] 4,215,823
[45] Aug. 5, 1980

[54] LASER NOZZLE CONSTRUCTION

[75] Inventors: Roger L. Wahl; John A. Dye, both of Lake Park, Fla.

[73] Assignee: United Technologies Corporation, Hartford, Conn.

[21] Appl. No.: 863,493

[22] Filed: Dec. 22, 1977

[51] Int. Cl.$^2$ .............................. B05B 1/14
[52] U.S. Cl. ..................... 239/553.3; 239/553.5; 239/555; 239/557; 239/568
[58] Field of Search ............... 331/94.5 D, 94.5 G, 331/94.5 P; 239/132.3, 553.3, 553.5, 554, 555, 557, 568, 590.3

[56] References Cited

U.S. PATENT DOCUMENTS

| | | | |
|---|---|---|---|
| 2,965,314 | 12/1963 | Salomon | 239/553.3 X |
| 3,398,466 | 8/1968 | Brown | 239/553.3 X |
| 3,434,522 | 3/1969 | Laurenty | 239/568 X |
| 3,602,432 | 8/1971 | Mulready | 239/555 X |
| 3,744,724 | 7/1973 | Caille | 239/553.5 |
| 3,819,321 | 6/1974 | Witt | 239/555 X |
| 3,970,417 | 7/1976 | Page | 239/553.3 |
| 3,986,138 | 10/1976 | Neal | 331/94.5 P |

FOREIGN PATENT DOCUMENTS

| | | | |
|---|---|---|---|
| 2413349 | 1/1976 | Fed. Rep. of Germany | 331/94.5 G |
| 2451309 | 5/1976 | Fed. Rep. of Germany | 331/94.5 D |

Primary Examiner—Robert B. Reeves
Assistant Examiner—Michael J. Forman
Attorney, Agent, or Firm—Jack N. McCarthy

[57] ABSTRACT

A laser nozzle, optical cavity walls, and combustion manifold system is formed having a plurality of laser nozzle members formed having two elongated projections on each side thereof, a forward projection and a rearward projection, and when said members are placed together, the rearward projections meet to form a solid wall while said forward projections are spaced to form an elongated nozzle. Side plates enclose the ends of the nozzle members and end plates cover the ends of the side plates and exposed surface of the end nozzle members. A cavity is formed between each pair of meeting rearward projections and spaced forward projections of adjacent nozzle members. A hot gas flow distributor liner is placed in each cavity through an opening in one side wall. The liner has a plate at one end which mates with a recess in the outer surface of the side wall. An opening in said plate is connected to the inside of said liner. A combustion manifold having an outer flange has the outer flange placed over the plates of the liners to hold them in place and is fixed to the adjacent edge of the side plate. The liner tapers inwardly as it extends into said cavity while the surface adjacent the elongated nozzle opening extends substantially parallel thereto. A modification shows a combustion manifold on both sides with shorter liners extending in a cavity from both sides to a point adjacent each other at the center of the cavity.

2 Claims, 2 Drawing Figures

LASER NOZZLE CONSTRUCTION

CROSS-REFERENCE TO RELATED APPLICATION

Application Ser. No. 863,494, now U.S. Pat. No. 4,161,285 issued July 17, 1979, to Paul Matheny et al for "LASER NOZZLE CONSTRUCTION" is being filed herewith and discloses and claims the basic construction.

BACKGROUND OF THE INVENTION

This invention relates to laser nozzles having individual laser nozzle members arranged to have a flow of a laser gas from the side thereof. A construction of this type is shown in Application Ser. No. 863,494, now U.S. Pat. No. 4,161,285, issued July 17, 1979, referred to above.

SUMMARY OF THE INVENTION

The primary object of the present invention is to provide means for controlling the hot gas flow distribution in a cavity in a laser nozzle upstream of the nozzle throat where hot gases are directed into the cavity from the side thereof.

Another object of this invention is to provide a hot gas flow distributor liner in the upstream subsonic cavity which minimizes hot gas temperature losses and the resulting cavity density variations.

A further object of the invention is to provide a liner within each cavity formed in the nozzle construction having a laser gas directed into from the side to eliminate spanwise temperature gradients within the laser nozzle members.

It is another object of this invention to provide a tapered liner to increase thermal response at the low-flow, downstream end, and maintain a constant internal static pressure distribution.

It is a further object of the invention to provide each liner with a plate at one end thereof which mates with the outer surface of a side wall when the liner is placed through an opening in the side wall and located in position in a cavity. The plates of the liners are all held in place by the mounting flange of a combustion manifold. Mating openings in the mounting flange and plates direct the hot gas from the combustion manifold into the liner.

DESCRIPTION OF THE PREFERRED EMBODIMENT

Figure 1:
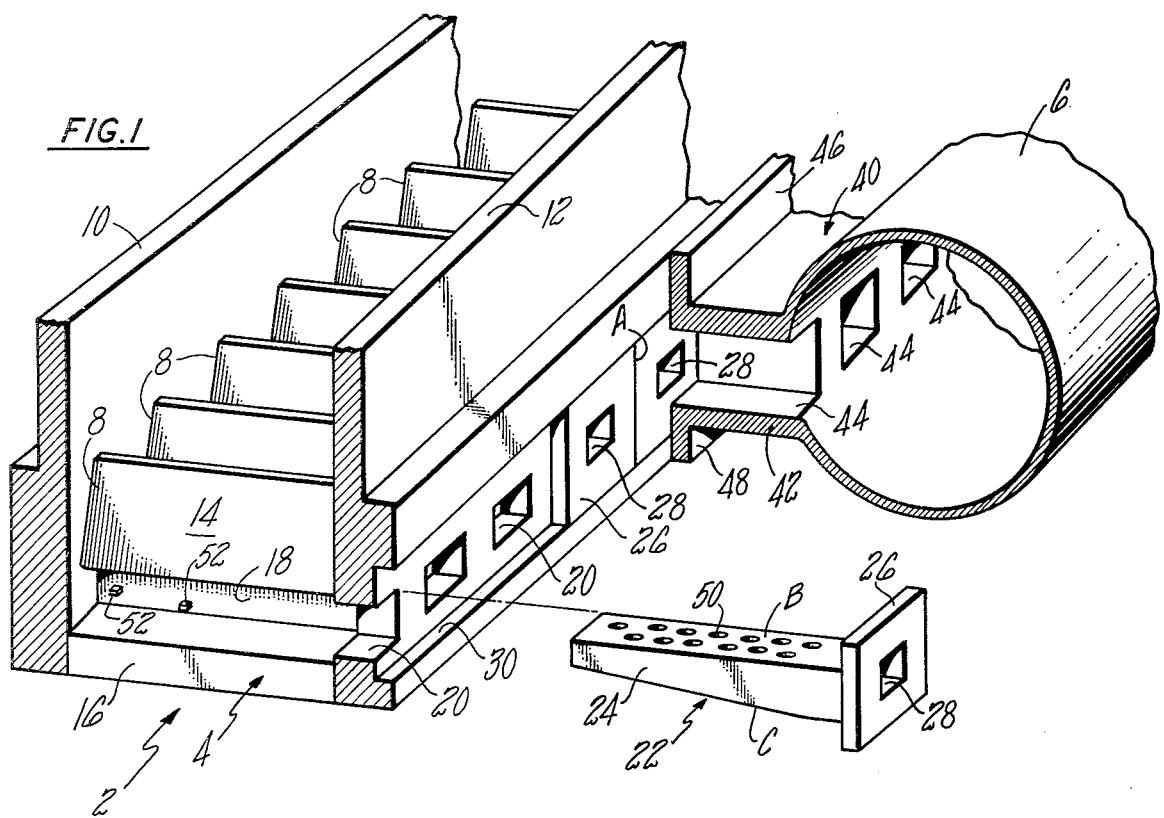
FIG. 1 is a perspective view of a section of a laser nozzle, optical cavity walls and combustion manifold used in a laser device, with a hot gas flow distributor liner shown withdrawn from its opening in a side wall.

With reference to FIG. 1, a laser device 2 comprises a laser nozzle construction 4 having an associated combustion distribution manifold 6 on one side thereof. The laser nozzle construction 4 is formed of a plurality of laser nozzle members 8 with a side plate 10 covering one end of the laser nozzle members 8 and a side plate 12 covering the other ends of the laser nozzle members 8. An end plate (not shown) is positioned over the exposed laser nozzle member 8 at each end of the plurality of members, along with the cooperating ends of the side plates 10 and 12.

Each laser nozzle member 8 is formed as an elongated block having two elongated projections on each side thereof along its entire length, a forward projection 14 and a rearward projection 16. When the rearward projections 16 of adjacent laser nozzle members 8 are placed together, they form a solid rear wall, while said forward projections 14 are spaced to form an elongated nozzle with throat as in prior laser nozzle members, or wafers. The rearward projections 16 are rectangular in their cross-section, and the forward projections 14 are tapered inwardly as they extend to their forward end so that adjacent surfaces 14 of adjacent nozzle members 8 form an expanding nozzle configuration having a throat. Gas flow cavities 18 are formed between the recessed portions of the adjacent nozzle members 8 between the rearward projections 16 and the forward projections 14.

To direct a flow of a gas for lasing to the flow cavities 18, openings 20 are provided in the side plate 12, one each at one end of each flow cavity 18 between adjacent nozzle members 8.

As seen in FIG. 1, a hot gas flow distributor liner 22 is shown positioned to be inserted through an opening 20 into a gas cavity 18. Each hot gas flow distributor liner 22 is formed having a liner body 24 with a plate 26 fixed to one end thereof. The liner body 24 is hollow and an opening 28 in the plate 26 is connected to the interior of the liner. An elongated recess 30 extends along the length of the side plate 12 along the line of openings 20.

The recess 30 extends for a distance above and below the openings 20. When a hot gas flow distributor liner 22 is located in position, the liner body 24 projects into the cavity 18 while the inner surface of the plate 26 mates with the bottom of the recess 30 and the outer surface of the plate 26 is even with the surface of the side plate 12. As each hot gas flow distributor liner 22 is put in place, the side edges of the plates 26 have engaging contact, such as at A.

The combustion distribution manifold 6 has a flange means 40 extending therefrom for directing flow to the openings 28 in the plates 26 of the hot gas flow distributor liners 22 while providing means for fixing the combustion distribution manifold 6 to the side plate 12 and engaging the outer surface of the plates 26 to hold the hot gas flow distributor liners 22 in place.

The flange means 40 comprises a conduit section 42 extending for the length of the combustion distribution manifold 6 and including a plurality of openings 44 which extend from the interior of the combustion distribution manifold 6 to the outer end thereof, one opening 44 for each opening 28 of plates 26. At the outer end, an elongated flange 46 extends upwardly therefrom and an elongated flange 48 extends downwardly therefrom. An elongated flange 46 is positioned over the top edges of the plates 26 and the surface of the side plate 12 above the plates 26, while the elongated flange 48 is positioned over the bottom edges of the plates 26 and the surface of the side plate 12 below the plates 26. These flanges 46 and 48 can be fixed to the side plate 12 by any means desired, such as by bonding, or by the use of bolts. While the conduit section 42 is formed having individual openings 44, it can be formed as a fully elongated opening.

Each hot gas flow distributor or liner 22 has its upper surface B extending parallel to the throat formed by the adjacent forward projections 14, while the lower surface C is tapered, reducing the area of the liner as it extends from its plate 26 to its closed end. This tapered liner body 24 provides an increased thermal response at the downstream end and provides a constant internal static pressure distribution. Openings 50 are placed along the surface B to distribute the flow uniformly against the nozzle span. It is well known in laser operation that an even temperature profile is desired in the laser cavity downstream of the laser nozzle members 8. These openings 50 can be formed of various sizes and in an experimental unit, equally spaced feed slots were used extending across the width of the surface B. While the openings are only showing along the surface B, they can be placed on other sides of the liner body 24.

Figure 2:
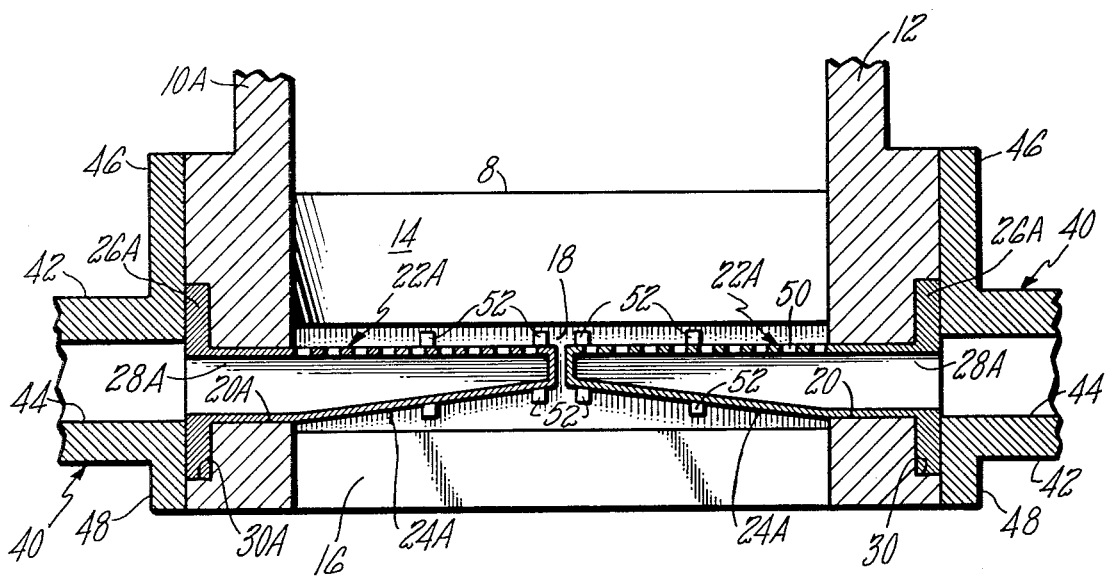
FIG. 2 is a sectional view taken through the side plates showing a laser nozzle member and a manifold flange on each side plate with modified hot gas flow distributor liners being positioned entering into a cavity formed between nozzle members from both sides.

As set forth in FIG. 2, an arrangement is shown having two hot gas flow distributor liners 22A, each entering a gas cavity 18 from each end thereof and with their inner ends being located adjacent each other at the center of the gas cavity 18. Each hot gas flow distributor liner 22A has a liner body 24A with a plate 26A fixed to one end thereof. The liner bodies 24A are formed as the liner bodies 24 of FIG. 1, being hollow and having an opening 28A in the plate 26A which is connected to the interior of the liner body 24A. The side plate 10A is constructed like side plate 12 having a recess 30A extending along the length of the side plate 10A along the line of the openings 20A, which extend through the side plate 10A like the openings 20 of side plate 12.

When the hot gas flow distributor liners 22A are located in position, each liner body 24A projects into the recess 18 from opposite ends, while the inner surfaces of the plates 26A mate with the bottom of the recesses 30 and 30A. As in FIG. 1, the side edges of the plates 26A have engaging contact. The combustion distribution manifold 6 is the same for both sides and is the same as shown in FIG. 1. The ends of the flange means 40 are shown against the side plates 12 and 10A positioned against the outer surfaces of the plates 26A to hold them in place.

In addition to this modification, the full extending hot gas flow distributor liners 22 can be positioned along the length of the nozzle construction 4, alternating in the direction from which they are inserted into the gas cavities 18. The side plate 10 can be made with alternate openings 20 blocked while the side plate 10 can have openings placed therein on the other side of the respective cavities 18, such as openings 20. A combustion distribution manifold 6 can also then be located against the side plate 10.

Projections 52 are placed on the walls of the cavity 18 between adjacent nozzle members 8 to support the hot gas flow distributor liners 22. These projections 52 can also guide the body liners 24 as they are inserted into the cavities 18.

We claim:

1. A laser nozzle comprising a plurality of stacked elongated nozzle members, each nozzle member having two elongated projections on each side thereof, a forward projection and a rearward projection, each rearward projection being formed having a flat outer surface, each forward projection being formed having a tapered outer surface, said tapered outer surface tapering inwardly as it extends to the forward end of the nozzle member, said nozzle members being placed adjacent each other so that in their stack the flat surfaces of the rearward projections meet to form a solid wall and said forward projections are spaced, adjacent forward projections of adjacent nozzle members forming an elongated nozzle having a throat, a cavity being formed between each pair of meeting rearward projections and spaced forward projections of adjacent nozzle members, side plates enclosing the ends of the plurality of nozzle members, end plate means being placed at each end enclosing the ends of the cooperating side plates and exposed surface of the end nozzle members, a hot gas flow distributor liner being fixedly positioned in each cavity, opening means through one of said side plates for directing a gas flow to each hot gas flow distributor liner, each hot gas flow distributor liner having a plurality of openings along its length positioned adjacent the throat of the elongated nozzle for delivering the gas flow directly to the throat of the elongated nozzle formed by adjacent nozzle members to minimize temperature losses in the hot gas, said hot gas flow distributor liner being tapered inwardly as it extends from its end receiving the gas flow from its opening means to increase thermal response at the downstream end.

2. A laser nozzle comprising a plurality of stacked elongated nozzle members, each nozzle member having two elongated projections on each side thereof, a forward projection and a rearward projection, each rearward projection being formed having a flat outer surface, each forward projection being formed having a tapered outer surface, said tapered outer surface tapering inwardly as it extends to the forward end of the nozzle member, said nozzle members being placed adjacent each other so that in their stack the flat surfaces of the rearward projections meet to form a solid wall and said forward projections are spaced, adjacent forward projections of adjacent nozzle members forming an elongated nozzle having a throat, a cavity being formed between each pair of meeting rearward projections and spaced forward projections of adjacent nozzle members, side plates enclosing the ends of the plurality of nozzle members, end plate means being placed at each end enclosing the ends of the cooperating side plates and exposed surface of the end nozzle members, a hot gas flow distributor liner being fixedly positioned in each cavity, opening means through one of said side plates for directing a gas flow to each hot gas flow distributor liner, each hot gas flow distributor liner having a plurality of openings along its length positioned adjacent the throat of the elongated nozzle for delivering the gas flow directly to the throat of the elongated nozzle formed by adjacent nozzle members to minimize temperature losses in the hot gas, a second hot gas flow distributor liner being fixedly positioned in each cavity, opening means through the other of said side plates for directing a gas flow to each second hot gas flow distributor liner, each hot gas flow distributor liner having a plurality of second openings along its length positioned adjacent the throat of the elongated nozzle for delivering the gas flow directly to the throat of the elongated nozzle formed by adjacent nozzle members to minimize the temperature losses in the hot gas, each of said hot gas flow distributor liners having inner ends, each of said hot gas flow distributor liners extending inwardly from said side plates to a location within each cavity where said inner ends of said first and second liners are adjacent each other, each of said hot gas flow distributor liners extending inwardly from said side plates to a center location within each cavity, each hot gas flow distributor liner being tapered inwardly in the same manner as it extends from its end receiving the gas flow from its opening means to increase thermal response at the downstream end.

* * * * *